Jan. 14, 1964   A. BERTIN ETAL   3,117,346
APPARATUS FOR SUPPLYING ROTARY MOLDS WITH FLUID DURING ROTATION
Filed May 13, 1958
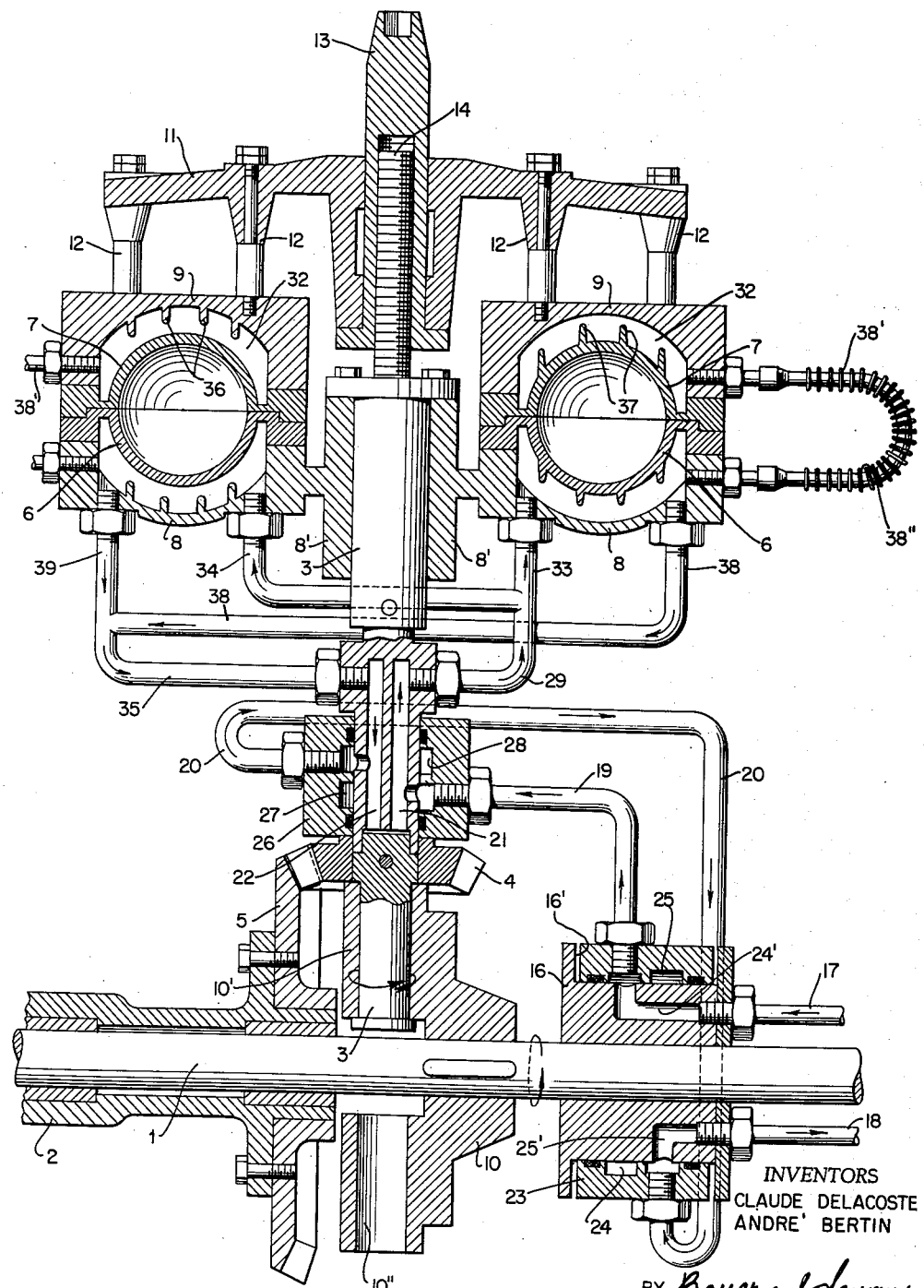
INVENTORS
CLAUDE DELACOSTE
ANDRE' BERTIN
BY Bauer and Seymour
ATTORNEYS

United States Patent Office 3,117,346
Patented Jan. 14, 1964

3,117,346
APPARATUS FOR SUPPLYING ROTARY MOLDS
WITH FLUID DURING ROTATION
André Bertin and Claude Delacoste, Paris, France,
assignors to Delacoste & Cie, Paris, France
Filed May 13, 1958, Ser. No. 734,922
Claims priority application France, May 20, 1957
2 Claims. (Cl. 18—26)

This invention relates to the centrifugal casting of plastic masses, particularly to the centrifugal casting of masses which are cast in the plastic state and are then transformed by thermal or chemical-thermal methods into strong objects.

This invention is widely used in the manufacture of hollow plastic articles. It is superior in its ability to distribute, transform and cure organic plastics.

It has already been proposed to manufacture hollow articles of plastic material by introducing into a hollow mold the requisite quantity of plastic material and subsequently pivoting this mold in different planes according to a predetermined sequence to regularly distribute the fluid plastic material on the inner wall of the mold, heating the latter until the plastic sets and hardens (as in the case of thermosetting resins), or sets to form a stabilized gel (as in the case of thermogellifying resins such as plastisol or organosol), allowing the mold to cool, opening it and finally extracting or stripping therefrom the hollow article thus manufactured.

To this end, the mold was fastened on a machine adapted to pivot it systematically in different planes, this machine being disposed in a space maintained at the temperature required for gelling the material. Then, it was necessary to separate the mold from the machine, extract it from the aforesaid space, immerse it in a bath at a temperature consistent with the complete setting or gelation, and finally either dip the mold into a cooling bath or apply a cold water jet thereto.

It is also known to subject the mold to different pivotal movements in different planes while immersing it at regular time intervals in successive warm and cold baths.

However, all these known methods require a costly and bulky equipment and the mold is soiled at the time of its cooling by immersion or spraying, and must be subjected to drying and cleaning steps prior to each molding operation.

It is an object of this invention to carry out centrifugal casting while simultaneously rotating molds centrifugally about different axes, and subjecting the molds to the different changes of temperature which are needed to complete the transformation of the cast article to its final form. Thus, in the case of certain plastisols, one may initiate the casting by rotating the molds centrifugally about a plurality of axes while maintaining the molds by heat exchange at that precise temperature which is best adapted to secure the yield and flow and distribution of the plastic mass over the surface of the mold, thereafter changing the temperature of the mold to one at which the distributed plastic mass gels, while continuing the centrifugal rotation, then changing the temperature of the mold, while continuing the rotation, to one at which the gelled plastic is hardened, each stage being continued until the entire thickness of the plastic is uniformly treated, finally changing the temperature of the mold, while continuing the rotation, until the molded article has been cooled to a temperature at which it is no longer subject to deformation by handling or accident.

The novel apparatus is of such nature that the centrifugal rotation of the mold can be stopped at any time while continuing the different thermal stages of the process. Furthermore, the source of supply of heat-exchange fluid, which may be used either to keep the molds and their contents cool, or to maintain them at a selected temperature, is of such construction that the temperature of the molds can be changed at will regardless of whether the molds are in centrifugal rotation or are still.

It is another object of the invention to provide an apparatus for centrifugal casting which is self-contained, requires no immersion tanks or vapor chest to receive the molds, has complete flexibility of continuous control, and requires no interruptions for transportation or change in process conditions.

This invention utilizes a jacketed hollow mold, introduces into the mold the requisite amount of plastic material, subjects this mold, after closing, to pivotal movements in different planes, and circulates successive fluids at different temperatures through the jacket. In a simple example, a thermoplastic mass can be put solid into the molds, which are closed, rotated and heated until the plastic melts and distributes itself in a regular layer on the inner surface of the molds, cooled until the formed article is set, opened and the article removed. In this simplest of examples, there is no chemical change, but only a melting, casting and cooling of the plastic in an uninterrupted sequence of heat treatments carried on during the continuation of the rotation.

It is another object of the invention to make centrifugal casting equipment having smaller over-all dimensions than apparatus now known and which is less costly to make.

Another object is to reduce labor costs by eliminating the stages of drying and cleaning of the molds which are now necessary.

A further object is to improve the thermodynamic efficiency by achieving more efficient and uninterrupted operation as well as by recovering heat from the hotter fluids for use in heating cooler fluids.

Other objects of the invention will become apparent as the specification and drawings are studied.

The objects of the invention are accomplished by subjecting a plastic mass to centrifugal rotation about a plurality of axes, while restricting the mass to motion within an enclosure, so as to form a hollow plastic mass, the mass being subjected during its rotation to whatever temperatures or series of temperatures, for whatever durations of time, are needed to efficiently initiate and complete the changes of condition or of constitution which are required by the plastic mass being used. Thus, if a particular plastic requires only a single operating temperature, that apparatus will perfectly produce that temperature, and if another plastic requires several stages of treatment at different temperatures to produce a perfect article, the apparatus will produce in sequence those stages of temperature.

As to apparatus, the invention includes the mechanical motions and combinations of parts which have been described and are claimed.

Referring now to the drawing,

FIGURE 1 is a vertical sectional view of an apparatus constructed in accordance with the principles of the invention.

The first shaft 1 is rotated by means (not shown) at whatever speed is required to achieve the molding operation undertaken. Keyed to this shaft is a hub 10 having an offset sleeve 10' which rotatably supports a shaft 3 which is the main support of the molds 6, 7. Fixedly attached to the shaft 3 is a bevel gear 4 which is in mesh with bevel gear 5 fixed to that part 2 of the frame of the machine which encircles and supports the shaft 1. The second shaft 3 is aligned transversely to the first and is shown in the drawing as being at right angles thereto. The shaft 3 has rigidly attached thereto a sleeve 8' to which is attached a pair of lower cups 8 which constitute the lower halves of the outer wall of a fluid jacket. Mounted on these cups are the lower halves 6 of the molds.

On the extremity of shaft 3 is positioned a screw-threaded stud 14 and a sleeve nut 13 in screw-threaded engagement therewith. The nut carries a cross-bar 11, to the arms 12—12 of which are attached tthe upper cups 9—9 of the jacket and 7—7 of the molds, and is provided with a socket for a wrench. The upper and lower halves or parts of the molds and cups are fitted so that they are sealed when they are in engagement. The cross-bar 11 and the upper parts of the molds can be raised by turning the screw 13 with a wrench, thus opening the molds and permitting the insertion of raw material or the removal of the finished product.

It will be seen from this structure that as the shaft 1 turns, it will swing the molds in a circular path about its axis, and that as it turns the gears 4 and 5 will impart rotary motion about the axis of shaft 3, thus imposing upon the molds centrifugal force about a plurality of axes or in different planes. By providing the sleeve 2 with driving means (not shown), different speed ratios will be established between the circumferential speed about the axis 1 and the circumferntial speed about the axis 3.

In order to provide the apparatus with means for generating those temperatures which are required for various processes, there is provided a stationary sleeve 16 which encircles but does not turn with shaft 1. The sleeve 16 is cylindrical as viewed from the end, and is provided with a circumferential groove 16' in which is seated a ring 23 which is provided with two internal circumferential grooves 24, 25, of which groove 24 is connected by a passage 24' to a fluid inlet pipe 17. The groove 25 is connected by passage 25' with exhaust pipe 18. The ring 23 is a slip ring which is capable of turning with respect to member 16. Pressure rings or stuffing encircle the cylindrical sleeve 16 outwardly of the grooves 24, 25. Thus, as the molds rotate about the axis of shaft 1, the ring 23 may rotate with them. Connected to the groove 24 is a pipe 19 which carries incoming fluid to inner circumferential groove 27 of the slip ring 26 which is mounted on the shaft 3. Another pipe 20 carries discharge fluid from the inner circumferential groove 28 to the groove 25. The inlet passage 21 in shaft 3 connects at its upper end with pipe 29 which supplies the mold jacekts through pipes 33 and 34. A plurality of flexible armored hoses 38' 38", the latter invisible behind hose 38', connect the upper halves of the mold jackets with the lower halves, carry the fluid into and out of the upper halves from and to the lower halves, and permit the opening, filling, and closing of the molds without draining the jackets. The flow of fluid in the jackets can be continuous or interrupted, at the same temperature or a different temperatures, as desired at any time of the operation. After the fluid has circulated through the jacket and about the molds 6, 7, it is returned to the passage 22 through pipes 38, 39 and 35.

The mold parts may be provided with fins or ribs 36, 37 which can be applied to the inside or the outside of the jacket, or to both, as desired. In FIGURE 1 the left-hand mold has fins applied to the outer wall of the jacket, and the right-hand mold has fins applied to the inner wall of the jacket.

As indicated by sleeve bearing 10", which is a duplicate of bearing 10', the molds on one side of the shaft 1 can be balanced by molds on the other side.

The operation of the apparatus is initiated by turning the nut 13 counterclockwise, as viewed from above, until the parts 7 of the molds are well elevated. A charge of plastic, or of material capable of becoming plastic by temperature change, is put in each part 6, and the molds are closed and sealed by rotating nut 13 clockwise.

Valves (not shown) are opened and fluid, for instance glycerin, at that temperature which is proper for the first stage of the process, flows through pipes 17, 19, passage 21, and pipes 29, 33, 34 to the jacket about the molds, from whence it returns through pipes 38, 39, 35, passage 22, and pipes 20 and 18 to a heater (not shown) to receive anew the calories lost in the operation.

The rotation of the molds can be started before, at the same time, or after the flow of fluid is initiated. This is begun by turning the shaft 1, thus rotating the molds about the axis of the shaft. At the same time the gears 4, 5 rotate the shaft 3 about its own axis, thus imparting rotation to the molds in a direction transverse to that imparted by shaft 1. The ratio of rotational speeds in the two directions will remain fixed at that which is established by the ratio of gears 4 to 5 unless rotation is imparted to sleeve 2. By imparting such rotation to sleeve 2, one can alter the ratio and attain any desired ratio, thus achieving the ability to vary the distribution of the plastic on the inside of the molds. Thus, if the speed of rotation about shaft 3 is very high compared to the speed of rotation about shaft 1, more material will flow toward the lateral walls of the mold, as viewed in the drawing, whereas more will flow oward the top and bottom if the speed of rotation about shaft 1 is high compared to that about shaft 3. This construction provides means for controlling the distribution of the plastic in the walls of the object being made.

After the first stage of the process is completed, for instance heating the plastic until it is free-flowing and has distributed itself over the walls of the mold, a second stage may be employed. One such stage will involve different heat treatment by flowing hotter fluid through the jacket, for instance to change the constitution of the hollow article which was formed in the first stage. The second stage can also consist of imparting greater speeds of rotation, whereby to increase the density of the walls of the object, with or without an increase of temperature. Another stage may involve a third temperature change, achieved by flowing fluid of yet different temperature through the jackets, with or without a change in rotational speeds.

As the rotation proceeds, the pipes 20, 19 will turn freely with the molds as permitted by slip ring 23, and the shaft will turn freely within slip ring 26.

A warm fluid may be delivered in the space between the two envelopes of the mold so as to gellify the plastic material, and due to the double rotational movement of the molds this plastic material is uniformly distributed on the inner walls of the molds. Fluids at gradually increasing temperatures may be delivered in succession to the double-walled molds to ensure the homogeneous distribution, then the gelation, and finally the complete fusion or polymerization of the plastic material according as the latter is of the thermoplastic or the thermosetting type. These fluids may be followed by others having gradually decreasing temperatures to cool the molds and their moldings. These operations take place without transferring the molds and without stopping their movements. Finally, the machine is stopped and the hollow article thus formed is stripped from the mold by loosening the central socket 13.

The plastic material employed with the method of this invention may be of the thermoplastic resin type such as vinyl chloride or polyethylene, for example in the form of plastisol, or the polymerizable esters of ethylene acids with an alcohol (butyl maleate, glycol methacrylate, etc.), or of acid with a polymerizable alcohol (such as allyl phthalate or maleate). Other compounds known in general under the name of polyesters, comprising one or more esters such as phthalate and maleate of glycol or higher glycols associated with a polymerizable monomer such as styrene, may be used.

In case a material of the plastisol type is utilized, the temperatures of the successive fluids delivered into the space formed by the double-walled mold structure may be, for example, as follows: 65° C., 165° C., 15° C.

These fluids may consist, for example, of glycerin, mineral oil or vegetable oil, or animal oil, or their derivatives, or any other adequate products such as diphenyl-, tetrachloro-, diphenylpentachloro-substances, or diphenyl-chloride oxide, or water, air, etc.

If the plastic material utilized is of the thermosetting polyester type, the successive temperatures of the fluid circulated in the jacket are of the order of 90° C., then 165° C. and finally 20° C.

The machine illustrated in the drawing comprises a group of two molds. Of course, a greater number of molds may be disposed around the shaft 3 perpendicular to the horizontal rotary shaft 1 of the machine, and a plurality of shafts 3 may be mounted around the shaft 1, for example symmetrically thereto, to balance the apparatus.

The apparatus has the advantages that the process may be truly continuous, that rotation of the apparatus need not be stopped to initiate temperature changes, that different rotational speeds and different ratios of rotational speeds may be used to change the physical characteristics of the walls, such as thickness in particular locations and density, that the molded objects may be firmly held under uniform, or, if desired, under changed or changing, centrifugal force throughout the process, producing unexampled uniformity, that conditions of treatment may be altered at different stages without releasing the centrifugal forces working on the molded objects, and that the method achieves new and superior flexibility, adapting it equally to the most diverse operations.

The following examples illustrate the applicability of the apparatus and the method to diverse operations with different plastics.

EXAMPLE 1

*Use of a Plastisol*

In a three-cylinder color mixer, or in a pony mixer, a mixture of the following plastisol was prepared, in the cold: Polyvinyl chloride, 160 parts by weight; plasticizer, 100 parts by weight (the plasticizer included 50 parts of di-octylphthalate and "Paraplex G–60," a product of Rohm & Haas Co., Philadelphia, Pa.); calcium carbonate, 10 parts by weight; dibutyl tin laurate, 1 part by weight. The plastisol thus produced was introduced into the molds of the invention, which were heated at 65° C. for ten minutes and rotated with shaft 1 at 10 r.p.m. in order to distribute the suspension over the walls of the molds. The ratio of gear 5 to gear 4 was such that the revolutions of the molds with shaft 3 were 2:1. The temperature was then raised to 165° C. for twenty minutes by flowing fluid at that temperature through the jacket about the molds. This cured the plastisol. Thereafter, the cooling fluid was passed through the jacket for fifteen to twenty minutes. The same rate of rotation was maintained throughout the process.

In various tests with plastisols, the speed of shaft 1 was changed between 5 and 20 r.p.m.

This example produces toys such as balloons, dolls and other supple and strong hollow objects. The objects are more or less rigid, depending upon the proportion of plasticizer. They may be made very rigid by replacing 30% of the plasticizer with diethylene glycol dimethacrylate containing 1% of its weight of tertiary butyl peroxide. One can obtain very fluid mixtures of organosols by adding to the plastisol from 5% to 15% of a suitable solvent such as xylene solvent and the like. In this case, it is possible, after removal from the molds, to eliminate the solvent by drying.

EXAMPLE 2

*Use of Polyethylene*

On a heated roll mill at 115° to 120° C., there were mixed 100 parts by weight of polyethylene and 0.75 part by weight of azo dicarbonamide, thus producing a good mixture after ten minutes. A sheet was drawn from the roll mill and cut into cubes of about 2 mm. on a side. These cubes were introduced into the molds and the temperature was raised to 120° C. for fifteen minutes while the molds were rotated for fifteen minutes at speeds as in Example 1. Cold water was then flowed through the jackets and the temperature was reduced to 25° C. before opening the molds and removing the objects. After removal from the molds, the objects were heated in an oven at 180° C. for thirty minutes.

This produces hollow molded objects which are very porous and have a specific weight of about 0.4. They are useful as toys, depending upon the shape of the mold, or as buoys for maritime use, or as elastic cushions. The molds used in this operation should be strong enough to support, during the heating phase, a pressure on the order of 70 kgs. per square centimeter. It will be observed that in all cases the strength of the molds should be such as to withstand the speeds of rotation and the pressures generated by the ingredients used in the molding operation. Construction of the apparatus is inherently strong, so that nothing is required except to see that the weight of metal in construction of the molds is sufficient.

EXAMPLE 3

*Use of a Thermo-Hardening Polyester Resin*

100 parts by weight of diallyl phthalate, 100 parts by weight of toluene, and 0.5 part by weight of benzoyl peroxide were heated for about twenty hours at 120° C. with good agitation, producing a viscous solution of diallyl polyphthalate in a mixture of diallyl phthalate monomer and toluene. The toluene was removed by distillation at 75° to 80° C. at pressures of 20 to 30 mms. of mercury, which produced a solution of diallyl polyphthalate in diallyl phthalate monomer containing about 20% polymer. To use this, one mixes 100 parts by weight of that solution with about 1 part by weight of tertiary butyl peroxide. This solution is viscous and is introduced into the molds of the apparatus of this invention, which are heated for ten minutes at 90° C. to distribute the mass, while rotation about axis 1 is at speeds similar to Example 1, then at 135° C. for thirty minutes, and finally the mass is cooled with cold water at 15° to 20° C.

This produces hollow rigid objects which are solid and transparent, and useful as toys, receptacles for solids and liquids, and as balls, depending upon the form of the mold employed. In this connection, it is to be observed that the shape of the molds shown would produce balls, but that any other shape of mold can be used, depending upon the purpose for which the objects are to be used.

EXAMPLE 4

*Use of a Polyester With a Polymerizable Monomer*

Into an apparatus, provided with an agitator, a thermometer, a reflux and means for introduction of a current of nitrogen, there were introduced 171 parts by weight of ethylene glycol and 875 parts by weight of diethylene glycol at a temperature of 80° C. There were added 736 parts by weight of maleic anhydride, 370 parts by weight of phthalic anhydride, and 110 parts of xylene, and the temperature was raised to 160° C. The xylene distilled off, carrying off the water formed by the reaction. Heating was continued at 200° C. for three hours, then at 210°–215° C. until the acid index reached 50. Thereafter, all the xylene was distilled off under vacuum of 20 to 30 mms. of mercury. The whole was cooled to 100° C., and 0.003% of tertiary butyl catechol was added as a stabilizer. Monomeric styrene was added in a proportion of 100 parts of polyester for 43 parts of styrene.

A mixture was prepared consisting of 100 parts by weight of the foregoing polyester containing styrene and 2 parts by weight of cyclohexanone peroxide. This mixture was introduced into molds placed in the apparatus according to the invention. The molds were heated at 60° C. for ten minutes to distribute the resin while rotating the molds about axis 1 at 20 r.p.m. The ratio of gear 4 to gear 5 was 1:1, so that there was also a rotation of 20 r.p.m. around axis 3. Thereafter the molds were heated while the rotation was continued at the same speed at 120° C. for fifteen minutes. This carried out the polymerization of the monomer. After the polymerization was completed, as aforesaid, the mass was cooled to 30° C. while the rotation was continued.

EXAMPLE 5
Use of a Termo-Hardening Phenolic Resin

A thermo-hardening phenolic resin was prepared by condensing at 40° C. for 24 hours the following products, by mixing them in a receptacle provided with an agitator: 100 parts by weight of phenol, 150 parts by weight of formaldehyde of 30% strength, and 5 liters of caustic soda in water of 50% concentration. There was thus produced a slightly colored solution of low viscosity, to which was added 12.5 parts of paraformaldehyde, and 25 parts by weight of acetone.

100 parts of the foregoing resin were then mixed with 10 parts of paratoluene sulphonic acid, and this mixture was introduced into molds according to the invention. After about 10 minutes of rotation in the cold, the molds were heated to about 60° C. Polymerization was effected in about 20 minutes at this temperature. Thereafter, the molds were cooled to about 20° C., thus producing objects which were rigid, slightly colored, and which were sufficiently treated when dried in an oven at 50° C. to eliminate the water and the acetone. According to the geometric form of a the molds, these objects can be used as toys, floats, and the like.

In order to increase the solidity of the objects, one can use the following composition: Solution of the resin above described, 100 parts by weight; paratoluene sulphonic acid, 10 parts by weight; fibers of cotton or linen of about 2 cm. in length, 20 parts by weight.

Good results are obtained at low rotational speeds, but higher speeds can be used with attention to the balance and strength of parts used in the machine.

As many apparently widely different embodiment of the invention may be made without departing from the spirit and scope thereof, it is to be understood that the invention is not limited to the specific embodiments.

What is claimed is:

1. Apparatus for supplying rotary molds with fluid during rotation about a plurality of axes which comprises a rotatable shaft supporting the molds, conduits in the shaft, conduits connecting the molds with said conduits, a channelled ring having channels opening into the conduits in the shaft, a second rotatable shaft supporting the first at right angles thereto, a channelled ring on the second shaft, conduits connecting the two channelled rings, means connecting the second channelled ring with a source of fluid, and means to rotate each shaft about its axis within its channelled ring.

2. Apparatus for the rotary casting of plastic masses comprising cooperating mold parts having cooperating seats adapted to form a seal, means to open and close the mold parts whereby to admit plastic thereto and to remove a formed object therefrom, a jacket supported contiguously to and circumscribing each mold part, means to flow a fluid into one said jacket, conduit means connecting the jackets together permanently whereby fluid may be flowed through the jackets in any position of the mold parts, conduit means to conduct the fluid out of the jackets, a first rotary shaft and a second rotary shaft to rotate the molds, jackets and conduit means about a plurality of axes, said mold parts being mounted on the second rotary shaft, and the second rotary shaft being provided with means to open and seal the mold parts, and means to supply a series of fluids to the jackets at different temperatures comprising a plurality of conduits in the second rotary shaft, means to supply a fluid to one conduit in the shaft during rotation of the shaft, means to conduct the fluid from the shaft to the jacket, means to conduct fluid from the jacket to another conduit in the shaft, and means to receive the fluid from the second conduit during rotation of the shaft.

References Cited in the file of this patent
UNITED STATES PATENTS

| | | |
|---|---|---|
| 660,638 | Holbrook et al. | Oct. 30, 1900 |
| 1,181,692 | Stroud | May 2, 1916 |
| 2,060,962 | Twiss et al. | Nov. 17, 1936 |
| 2,064,162 | Hottel | Dec. 15, 1936 |
| 2,433,065 | Rubissow | Dec. 23, 1947 |
| 2,518,504 | Stott | Aug. 15, 1950 |
| 2,536,692 | Miller | Jan. 2, 1951 |
| 2,583,955 | Lawson et al. | Jan. 29, 1952 |
| 2,624,072 | Delacoste et al. | Jan. 6, 1953 |
| 2,659,107 | De Bell | Nov. 17, 1953 |
| 2,696,024 | Mobley et al. | Dec. 7, 1954 |
| 2,808,967 | Miller | Oct. 8, 1957 |

FOREIGN PATENTS

| | | |
|---|---|---|
| 15495/28 | Australia | June 17, 1929 |

OTHER REFERENCES

"More Bounce in Vinyl Balls," from Modern Plastics (I), 4 pp., September 1954.

"Plastisol Viscosity-Temperature Characteristics," from Modern Plastics (II), 11 pp., September 1956.